E. G. VOEGELI.
TRACTOR MOTOR TRUCK.
APPLICATION FILED OCT. 29, 1921.
1,438,414.
Patented Dec. 12, 1922.
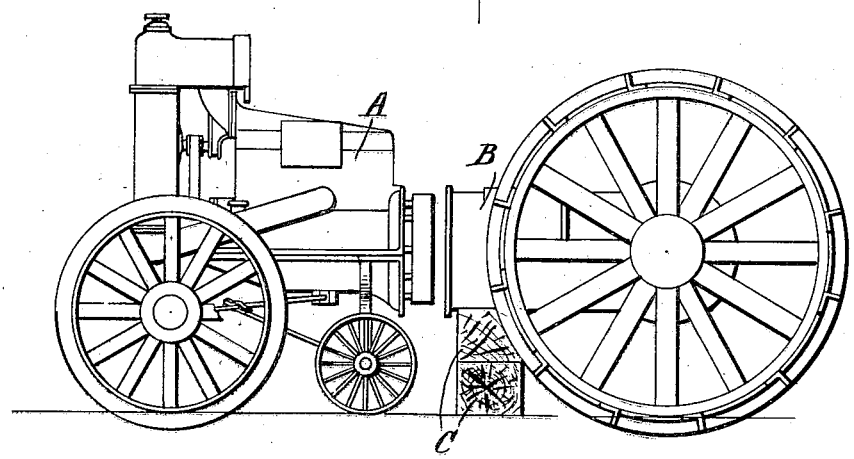
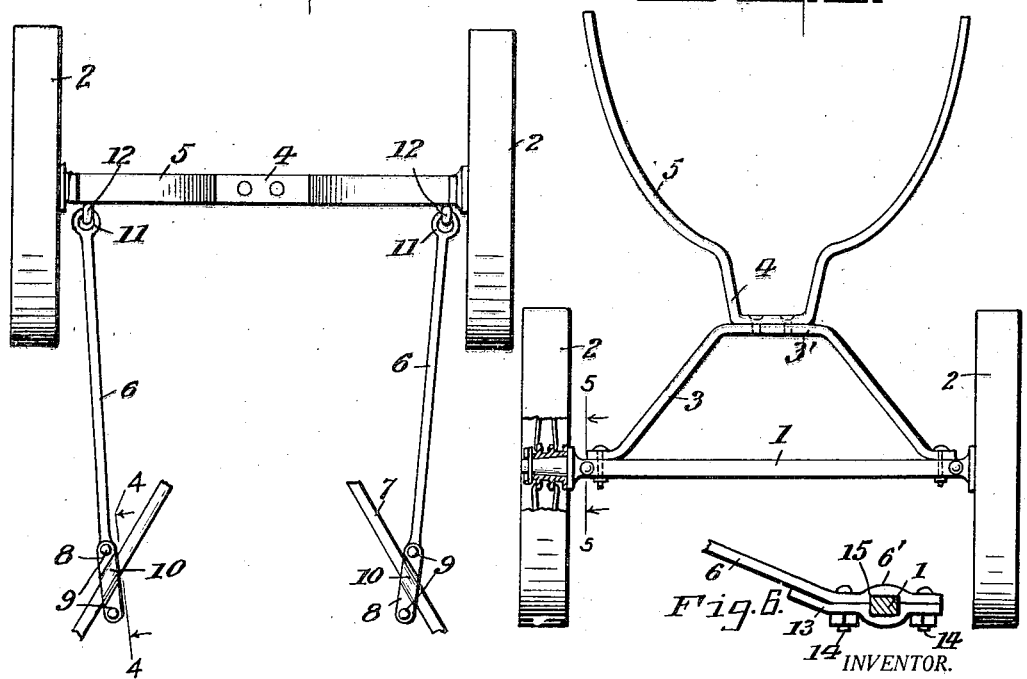
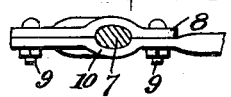
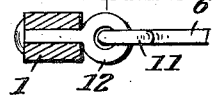
INVENTOR.
Emil G. Voegeli
BY
William J. Jacobi
ATTORNEY.

Patented Dec. 12, 1922.

1,438,414

UNITED STATES PATENT OFFICE.

EMIL G. VOEGELI, OF MONTICELLO, WISCONSIN.

TRACTOR MOTOR TRUCK.

Application filed October 29, 1921. Serial No. 511,278.

*To all whom it may concern:*

Be it known that EMIL G. VOEGELI, a citizen of the United States, residing at Monticello, in the county of Green and State of Wisconsin, has invented certain new and useful Improvements in Tractor Motor Trucks, of which the following is a specification.

This invention has relation to certain new and useful improvements in a tractor motor truck and has for its primary object the provision of a truck which may be employed to support the motor of a tractor and serve as a truck for the same when disconnected from the remaining portion of the tractor for the purpose of repairs or for any other purposes.

The invention has for an object the provision of a tractor motor truck which will be of simple construction and operation and which may be readily connected with the motor section of a tractor such as the Fordson when it is desired to disconnect this portion of the tractor from the remaining portion for any purpose.

The invention has for a further object the provision of a truck of the character stated which will be composed of the minimum number of parts, may be readily placed in position or removed and when in position will support the rear end of the tractor motor in the proper position for connection with the opposite portion or section of the tractor, so that these parts may be properly alined for reconnection.

The invention has for a still further object the provision of a truck of the character stated which will be of inexpensive construction and will serve, when positioned to properly support the tractor motor.

With the foregoing and other objects in view as will appear as the description proceeds, the invention consists in the novel construction, combination and arrangement of co-operating elements as hereinafter more specifically set forth, claimed and shown in the accompanying drawings forming a part of the present application and in which:—

Figure 1 is an elevation of a tractor of conventional form such as the Fordson with the two sections thereof disconnected and my improved truck in use to support the rear end portion of the tractor motor.

Figure 2 is an elevation of the truck removed.

Figure 3 is a top plan view of the truck and showing the manner in which the same is connected at its forward end to the radius rod.

Figure 4 is a detail sectional view on the plane of line 4—4 of Fig. 3, looking in the direction indicated by the arrows.

Figure 5 is a detail view on the plane of line 5—5 of Fig. 2, looking in the direction indicated by the arrows.

Figure 6 is a view similar to Fig. 5, showing a slightly modified form of the invention.

Referring more in detail to the drawings in which similar reference characters designate corresponding parts throughout the several views, 1 indicates the axle of the truck carrying the removable ground wheels 2, so that one of these wheels may be readily removed when placing the truck in position, as will be later clearly understood. This axle 1 has rigidly mounted thereon the supporting arch 3 which is secured by its opposite end portions upon the axle 1, adjacent the ends thereof and inwardly of the wheels 2, as clearly shown in Fig. 2 of the drawings. Secured upon the upper central portion 3' of the arch 3 is the downwardly offset portion 4 of the substantially U-shaped tractor motor supporting member 5 which has its opposite upstanding arms concaved on their inner faces by bending these members to conform to the shape of the motor casing at the point at which this truck is to be positioned, as shown in Fig. 1 of the drawings. For securing the truck in the position shown in Fig. 1, the forwardly extended rods 6 are connected to the axle 1 adjacent the end thereof and inwardly of the wheel 2, as shown in Fig. 3. These rods 6 extend forwardly and slightly converge so as to pass beneath the opposite side portion of the radius rod 7 of the tractor, suitable clamping members 8 being secured upon the forward end portion of the rod 6 by clamping bolts 9 or the like. These clamping members 8 together with the forward end portions of the rod 6 are provided with pockets opposed to one another so as to receive the radius rods 7, as clearly shown in Figs. 3 and 4 and to securely clamp upon this radius rod 7. The rods 6 are shown as having eyes 11 formed at their rear ends and secured upon the eye bolts 12 carried in the axle 1, as shown in Fig. 5. These rods 6, connected in the manner stated to the axle 1 and the radius rod 7 will serve to retain the axle 1 in proper position with the rear portion of the engine section of the tractor resting on the member 5, as shown in Fig. 1. The engine section of the tractor may be designated by the letter A while the rear section or remaining section of the tractor is designated by the letter B. The forward part of the section B of the tractor is shown as being supported upon the block C in Fig. 1 so as to make it possible for the sections A and B to be properly alined when separating or reconnecting these parts of the tractor for the purposes of repair or for any other purposes.

In Fig. 6 I have shown a slightly modified form of the invention in which the rods 6 are shown as having their rear ends extended, as shown at 6' for engagement over the axle 1 and the clamping members 13 employed in connection with these ends 6' to clamp the same upon the axle 1. The connecting bolts 14 or other suitable members are employed for connecting the clamping member 13 and the rear end 6' of the rod 6 and these clamping members 13 and extended ends 6' of the rods 6 are provided with opposed pockets or recesses 15 to accommodate the axle 1. This manner of connecting the rear ends 6' of the rods 6 with the axle 1 will prevent all possibility of turning of the axle 1, thereby making it impossible for the member 5 to slip out of position from beneath the engine section A of the tractor.

It is believed that the complete construction and operation of this device may now be readily understood without further detailed description. It is to be borne in mind that while the preferred embodiment of the invention has been shown and described, minor changes in the details of construction and arrangement of parts may be resorted to within the scope of what is claimed without departing from the spirit of the invention.

What I claim is:—

1. A tractor motor truck comprising an axle, a supporting member carried on said axle, a tractor engine section receiving member carried on said supporting member, and meas for connecting said axle to the radius rod of the tractor, and ground wheels removably mounted on said axle.

2. A tractor section truck comprising an axle, removable ground wheels carried by said axle, means for connecting said axle with the radius rod of the tractor engine section and preventing turning of said axle, a supporting member carried on said axle, and a resilient member mounted on said supporting member to receive the rear portion of the tractor engine section to support the latter in elevated position when disconnected from the remainder of the tractor.

3. A tractor section supporting truck comprising an axle, ground wheels removably mounted on said axle, a resilient tractor section supporting member rigidly mounted on said axle and adapted to receive and form a seat for the free end of a disconnected section of the tractor, and means for rigidly connecting said axle with a stationary portion of the disconnected tractor section previous to disconnection thereof from the remainder of the tractor and preventing the rotation of said axle.

In testimony whereof I affix my signature.

EMIL G. VOEGELI.